Figure 1:
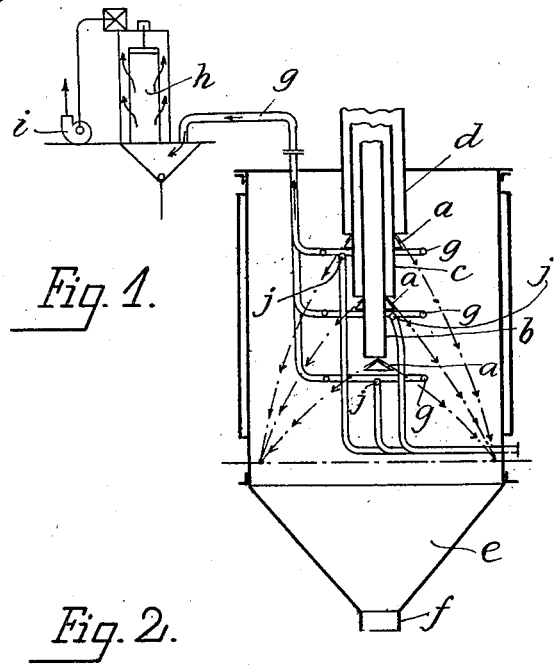

O. KRAUSE.
APPARATUS FOR MIXING GRANULAR SUBSTANCES.
APPLICATION FILED NOV. 23, 1920.

Patented Feb. 22, 1921.

Inventor
Oscar Krause
By ... Attorney.

UNITED STATES PATENT OFFICE.

OSCAR KRAUSE, OF COPENHAGEN, DENMARK.

APPARATUS FOR MIXING GRANULAR SUBSTANCES.

1,369,248.  Specification of Letters Patent.  Patented Feb. 22, 1921.

Application filed November 23, 1920. Serial No. 426,034.

*To all whom it may concern:*

Be it known that I, OSCAR KRAUSE, subject of the King of Denmark, residing at Copenhagen, Denmark, have invented new and useful Improvements in Apparatus for Mixing Granular Substances, of which the following is a specification.

This invention relates to a process and associated apparatus for the production of a practically homogeneous mixture of granular substances such as seeds, grain, mineral products, etc.

The object of the present invention is to eliminate and render superfluous any stirring or analogous working of the substances to be mixed together, this result being attained, according to the invention, by the substances being combined under such circumstances, preferably in the air, that they become mixed when and by meeting each other, and then follow each other during their further travel to the place of collection, retaining essentially their relative position.

The operation in question is effected in the easiest and most certain manner by causing the substances to meet each other during their free fall in the air, while they move along parabolas of fall, but other motive power than gravitation, for instance air-pressure may also be used for imparting to the substances the movements during which they are to meet each other and become mixed in the air.

If the substances are caused to meet during free fall, the parabolas of fall may either extend from the same side of the meeting point or from opposite sides of the same. In either case, the parabolas may be shaped in such a manner that the substances descending along them acquire or retain a tendency to follow each other on their further path as a uniform mass. This necessary adjustment of the shape of the parabolas of fall at the meeting point may be effected, according to the circumstances, by adjustment of the angle at which, or of the point from which, the substances commence their free fall (for instance from the terminal edge of an inclined plane).

According to these principles the substances may be caused to meet each other in the form of streams of larger or smaller width and of circular, oval, rectangular or other cross-section, or in the form of other thin-walled bodies for instance such having annular cross-section.

In case of a mixture of more than two substances, it will of course be more correct, in theory, to let them all meet at one single point, but for practical reasons it may be necessary not to insist fully on this requirement, and to let them meet successively, the distance between the successive meeting points being preferably small.

In any case the substances should meet and become mixed at a point as close as possible to the point where the mixture is to stop its motion and become stored. If the mixture drops directly into a bag, the bag may be kept in motion downward during filling, in order that the mixing point may always be located immediately above the surface of the contents of the bag. The reason for this is evidently that the shorter a distance the substances have to cover, after meeting and becoming mixed, before the mixture becomes stationary, the less will this homogeneity be in danger of becoming reduced owing to the different specific gravities, etc., of the substances.

The treatment here referred to offers immediate opportunity to free the substances of dust and the like, and to treat them with light, dry air, etc., as such treatment may easily be performed during the free fall of the substances.

Figure 2:
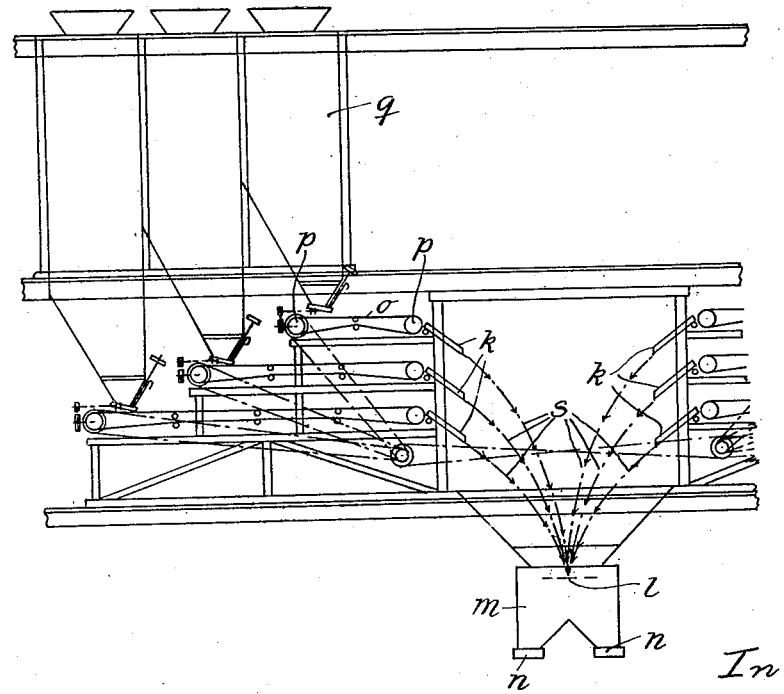

Figure 1 of the accompanying drawing is a diagrammatic vertical section of one form of apparatus constructed in accordance with the invention, and Fig. 2 is a similar view of a second or modified form.

The apparatus shown in Fig. 1 is arranged with co-axial outlet openings for the various materials, which will thus be caused to move along co-axial paraboloids or similar surfaces, the discharge being effected along distributing cones *a* (three such are shown on the figure), which are provided below the discharge openings, the bottommost of which is formed by a tube *b*, and the two upper ones by the spaces between this tube *b* and another tube *c* encircling it co-axially, and between the latter tube and a co-axially encircling tube *d*, respectively. The tube *b* and the tube spaces *c* and *d* communicate each with a different receptacle for the various kinds of materials to be mixed.

By mechanical means, which are not shown on the drawing, the cones *a* and the tubes $b$, $c$ and $d$ may be displaced vertically in order to be adjusted in such a manner that the paraboloid-shaped streams of material as shown on the drawing will meet at one and the same plane A—A in which the mixing is consequently effected. This plane is located close to the top surface of a hopper $e$ for the mixed material which may be discharged from the receptacle by way of a spout $f$.

About the spreading cones $a$ there are provided circular perforated tubes $g$ at some distance from the cones, the said tubes being connected, by way of a conduit $g'$ and a dust-separator $h$, to a suction device $i$, while a supply tube $j$ for the outer air has its discharge orifice below each spreading cone. A suction will then be established near each point of discharge for the material, whereby the latter will be freed of dust without its free fall being impeded.

In the apparatus shown in Fig. 2, the streams of material are of rectilinear cross-section, as the discharge is effected along inclined planes $k$ disposed symmetrically about a vertical center line and above one another in such a manner that there are provided, in the construction shown on the drawing, two sets of such discharging inclined planes, each set consisting of three superimposed inclined planes. The apparatus may consequently be used for mixing six different kinds of material which fall along the lines S as streams of a certain width. By mechanical means, which are not shown on the drawing, the inclined planes may be adjusted to various angles, so that all the materials may meet practically at one place, namely along a line $l$ located within or slightly above the receptacle $m$ provided below for the mixed material, from which receptacle the material may then be discharged by way of spouts $n$, $n$. The supply of the various materials, each to its inclined plane $k$, is effected, in the shown construction, by means of belt-conveyers $o$ passing over rollers $p$ and receiving the material each from one of a corresponding number of bins $q$. Even by this arrangement, air ventilation may easily be arranged as in the case of the first described arrangement.

Instead of the materials being kept absolutely separate, as assumed above, until they are allowed to fall freely, they may also be collected in layers on one and the same belt conveyer, which latter passes successively below the various bin spouts. The materials will then be deposited in superimposed layers, and when the entire stream leaves the inclined plane of fall, or the belt, the materials will fall as more or less separate streams following parabolas of fall, and the center lines of the various streams will then, as in case of the first arrangement, meet at a lower point, where the mixing will then become complete.

It may be mentioned that any suitable feeding devices can, of course, be used to convey the various materials to the points of fall, for instance shaking troughs from which the materials may either be discharged directly to free fall, or may be fed onto inclined planes of fall or the like. Generally, the constructive embodiment of the principles underlying the invention may be varied to a very great extent, as many constructive means will be at hand for the purpose.

Having now particularly described and ascertained the nature of my said invention and in what manner the same is to be performed, I declare that what I claim is:

Apparatus for mixing together different granular substances, comprising individual delivery means for the different substances, and discharging means individual to each delivery means and having a downwardly inclined surface along which the corresponding substance slides and from which it is discharged to fall freely through the air in a parabolic path, said discharging means having their inclined surfaces arranged to cause all of the substances to meet each other at a substantially common point in their fall and thus mix and thereafter follow each other throughout the remainder of the fall as a uniform mass to a place of collection while maintaining approximately their relative positions.

In testimony whereof I have affixed hereunto my signature.

OSCAR KRAUSE.